(12) United States Patent
Kano

(10) Patent No.: US 7,171,750 B2
(45) Date of Patent: Feb. 6, 2007

(54) METHOD OF PRODUCING A TORSIONAL DAMPER

(75) Inventor: Tsutomu Kano, Saihaku-gun (JP)

(73) Assignee: Nok Corporation, Tokyo (JP)

( * ) Notice: Subject to any disclaimer, the term of this patent is extended or adjusted under 35 U.S.C. 154(b) by 74 days.

(21) Appl. No.: 10/503,495

(22) PCT Filed: Jul. 23, 2003

(86) PCT No.: PCT/JP03/09337

§ 371 (c)(1),
(2), (4) Date: Aug. 5, 2004

(87) PCT Pub. No.: WO2004/031610

PCT Pub. Date: Apr. 15, 2004

(65) Prior Publication Data

US 2005/0116401 A1    Jun. 2, 2005

(30) Foreign Application Priority Data

Oct. 4, 2002    (JP)    ............................. 2002-292048

(51) Int. Cl.
*F16F 7/00* (2006.01)
*B23P 13/00* (2006.01)

(52) U.S. Cl. .................. 29/896.93; 29/451; 29/458; 29/525; 74/574.4; 428/405

(58) Field of Classification Search .................. 29/446, 29/451, 458, 525, 892, 892.1, 896.93, 527.2; 474/178; 74/574.4
See application file for complete search history.

(56) References Cited

U.S. PATENT DOCUMENTS 2,659,622 A * 11/1953 Watter .......................... 295/11

| 4,378,865 | A | * | 4/1983 | McLean ...................... 188/379 |
| 4,395,809 | A | * | 8/1983 | Whiteley ...................... 29/451 |
| 5,140,868 | A | * | 8/1992 | Mizuno et al. ............. 474/166 |
| 5,465,485 | A | * | 11/1995 | Miyake et al. ........... 29/892.11 |
| 5,540,626 | A | * | 7/1996 | Asai et al. ...................... 474/94 |
| 5,843,264 | A | * | 12/1998 | Mabuchi et al. ............ 156/245 |
| 6,345,430 | B1 | * | 2/2002 | Haga et al. ................... 29/458 |

FOREIGN PATENT DOCUMENTS

| JP | 60-006774 | 1/1985 |
| JP | 60006774 A * | 1/1985 |

(Continued)

*Primary Examiner*—Jermie E. Cozart
(74) *Attorney, Agent, or Firm*—Jacobson Holman PLLC

(57) ABSTRACT

To provide a method of producing a torsional damper to prevent an annular rubber undulation in the pressing of the annular rubber between a hub and an annular mass, improve strain durability of the torsional damper, and decrease a press-in load in the press-in of the annular rubber, and enhance axial and radial run-out accuracy of the annular mass to a hub bore portion. To this end, in the method of producing the torsional damper made by pressing the annular rubber in an axial direction between the hub and the annular rubber, a silane coupling agent is applied to the hub faces and the annular mass between which faces the annular rubber is pressed, and the agent is dried. A fitting liquid is then applied to any one of the hub, the annular mass or the annular rubber, and the annular rubber is pressed between the hub and the annular mass.

4 Claims, 3 Drawing Sheets

FOREIGN PATENT DOCUMENTS

| | | |
|---|---|---|
| JP | 60-139431 | 7/1985 |
| JP | 60-141533 | 7/1985 |
| JP | 01144485 A * | 6/1989 |
| JP | 02-085543 | 3/1990 |
| JP | 04-134715 | 5/1992 |
| JP | 2001-027287 | 1/2001 |
| JP | 2001027287 A * | 1/2001 |
| JP | 2001-263423 | 9/2001 |

* cited by examiner

METHOD OF PRODUCING A TORSIONAL DAMPER

This is a nationalization of PCT/JP2003/009337 filed Jul. 23, 2003 and published in Japanese.

BACKGROUND OF THE INVENTION

FIELD OF THE INVENTION

The present invention relates to a torsional damper used for absorbing a torsional vibration generated at a rotary shaft such as a crankshaft of an engine or the like.

In the invention according to the patent application by NOK VIBRACOUSTIC KK, which was described in Japanese Patent Laid Open No. 2001-27287, an excellent technique is described, wherein when an annular rubber is pressed in between the opposed faces of a metal hub and an annular mass disposed on the outer peripheral side of the metal hub, a silane coupling agent is applied to the opposed faces to increase sliding torque sharply between the hub and the annular rubber, and the annular rubber and the annular mass after the pressing.

However, the silane coupling agent has the problem that the silane coupling agent has a comparatively long predetermined time period after applying the agent until drying, and a press-in ability is decreased in the pressing of the annular rubber in immediately after applying the silane coupling agent since the agent becomes to have tackiness, and the rubber is pressed-in in the undulated state greatly. So, the durability of the torsional damper may be decreased.

Moreover, an organosilane has been used conventionally as a slip-proof agent and a lubricant in the press-in, as described in Japanese Patent Laid Open No. 2001-263423. However, since the press-in load in the press-in of the annular rubber is large, there are many residual stresses in the rubber, so that axial and radial run-out accuracy of the annular mass with respect to a hub bore portion is remarkably decreased.

The present invention solves the above-mentioned problems, and has an object to provide a method of producing the torsional damper capable of preventing undulation of the rubber from occurring in the pressing of the annular rubber in between the hub and the annular mass, and improving strain durability of the torsional damper. Furthermore, the present invention also has an object to provide the method of producing the torsional damper capable of significantly decreasing the press-in load in the press-in of the annular rubber, and enhancing the axial and radial run-out accuracy of the annular mass with respect to the hub bore portion.

SUMMARY OF THE INVENTION

In order to realize the above-mentioned objects, a method of producing a torsional damper according to the present invention, where an annular rubber is pressed in an axial direction in between a hub and an annular mass, the method comprising, applying a silane coupling agent to faces of the hub and the annular mass between which faces the annular rubber is pressed in, leaving the silane coupling agent for a predetermined time period to be dried, applying a fitting liquid such as a lubrication oil or the like to the hub and one of the annular mass and the annular rubber, and pressing the annular rubber in between the hub and the annular mass.

Furthermore, the method of producing the torsional damper according to the present invention comprising, applying the silane coupling agent without carrying out a chemical surface treatment to the faces of the hub and the annular mass between which faces the annular rubber is pressed in, in the method.

When the silane coupling agent is applied to the faces of the hub and the annular mass between which faces the annular rubber is pressed in, and is left for the predetermined time period after the application, the silane coupling agent is dried, as the production method according to the present invention having the above-mentioned constitutions. The predetermined time period from applying the agent until drying is about 2 hours suitably, although based on conditions. When the silane coupling agent is dried fully, the tackiness of the agent can be removed, and when the tackiness is removed, the annular rubber can be pressed in comparative smoothly. When the annular rubber is pressed in smoothly, the annular rubber is pressed in uniformly, and an internal stress of the rubber becomes uniform, and thus it is possible to improve the strain durability of the torsional damper, as the desired object. When the silane coupling agent is applied, there is no necessity of the chemical surface treatment to the faces of the hub and the annular mass between which faces the annular rubber is pressed.

Further, after drying the silane coupling agent, when the annular rubber is pressed in between the hub and the annular mass after applying the fitting liquid such as the lubrication oil or the like to the hub and one of the annular mass and annular rubber, a frictional resistance in the press-in of the annular rubber can be sharply reduced, and the press-in load in the press-in can be reduced, so that the internal stress of the rubber can become uniform. Therefore, it is possible to easily carry out the press-in work, improve the strain durability of the torsional damper as the desired object, and enhance the axial and radial run-out accuracy of the annular mass to the hub bore portion.

As the silane coupling agent, an amine-base or urethane-base silane coupling agent can be used. As the amine-base silane coupling agent (an amino group-containing silane coupling agent), the following agents can be used, that is, ☐-aminopropyltrimethoxysilane, ☐-aminopropyltriethoxysilane, ☐-aminopropylmethyldimethoxysilane, ☐-aminopropylmethyldiethoxysilane, ☐-(2-aminoethyl)aminopropyltrimethoxysilane, ☐-(2-aminoethyl)aminopropylmethyldimethoxysilane, ☐-(2-aminoethyl)aminopropyltriethoxylsilane, ☐-(2-aminoethyl)aminopropylmethyldiethoxy silane, ☐-ureidopropyltrimethoxysilane, N-phenyl-☐-aminopropyltrimethoxysilane, N-benzyl-☐-aminopropyltrimethoxysilane, N-vinylbenzyl-☐-aminopropyltriethoxylsilane or the like.

Further, as the urethane-base silane coupling agent (isocyanate group-containing silane coupling agent), the following agents can be used, that is, ☐-isocyanate propyltrimethoxysilane, ☐-isocyanate propyltriethoxysilane, ☐-isocyanate propylmethyldi methoxysilane, ☐-isocyanate propylmethyldiethoxy silane, or the like.

Moreover, in the present invention, a silane coupling agent other than the amine-base or urethane-base silane coupling agent can be used as an ingredient applied to the faces of the hub and the annular mass between which faces the annular rubber is pressed in. As such the silane coupling agent, the following agents can be used, that is, mercapto group containing silanes, such as □-mercaptopropyl trimethoxysilane, □-mercaptopropyl triethoxysilane, □-mercaptopropylmethyldimethoxysilane, □-mercapto propyl methyldiethoxysilane or the like, epoxy group containing silanes, such as □-glycidoxypropyl trimethoxysilane, □-glycidoxypropyltriethoxysilane, □-glycidoxypropylmethldimethoxysilane, β-(3,4-epoxycyclohexyl)ethyl trimethoxysilane, β-(3,4-epoxycyclohexyl) ethyltriethoxysilane or the like, carboxysilanes, such as β-carboxyethyltriethoxy silane, β-carboxy ethylphenylbis (2-methoxyethoxy) silane, N-β-(carboxymethyl)aminoethyl-□-amino propyltrimethoxysilane or the like, vinyl type unsaturated group containing silanes, such as vinyltrimethoxysilane, vinyltriethoxysilane, □-methacryloyloxypropylmethylditrimethoxysilane, □-acroyloxypropylmethyl triethoxysilane or the like, halogen-containing silanes, such as □-chloropropyl trimethoxysilane or the like, isocyanurate silanes, such as tris (trimethoxysilyl) isocyanurate or the like. Further, following compounds can be also used, that is, an amino-modified silylpolymer, which is a derivative obtained by modifying these silanes, a hydrosilylation aminopolymer, an unsaturated aminosilane complex, a blocked isocyanate silane, a phenylamino long-chain alkylsilane, an amino silylation silicone, a silylation polyester or the like.

Although these silane coupling agents may be used with only one kind, they may be also used by mixing two kinds or more.

Moreover, as the lubrication oil, an aromatic hydrocarbon compound, a plasticizer, a softening agent or the like can be used. As the plasticizer, a phthalic acid derivative or the like can be used. As the softening agent, a paraffinic softening agent or the like can be used.

Although these lubrication oils may be used with only one kind, they may be used by mixing two kinds or more.

Furthermore, the present application contains the following preferred embodiments.

① The toritinal damper in which the annular rubber is pressed in an axial direction in between the hub and the annular mass.

② The silane coupling agent is applied between the hub and the annular rubber, and the annular rubber and the annular mass.

③ The chemical surface treatment is not carried out to the face of each part where the silane coupling agent is applied.

④ The silane coupling agent is sprayed to the faces of the hub and the annular mass between which faces the annular rubber is pressed in.

⑤ The parts applied with the silane coupling agent are left for drying for 2 hours or more.

⑥ After the agent is dried, the fitting liquid such as the lubrication oil or the like is applied to the hub and one of the annular mass and the annular rubber, and then annular rubber is pressed in.

DETAILED DESCRIPTION OF PREFERRED EMBODIMENT

Next, the preferred embodiment of the present invention is explained based on the drawings.

Figure 1:
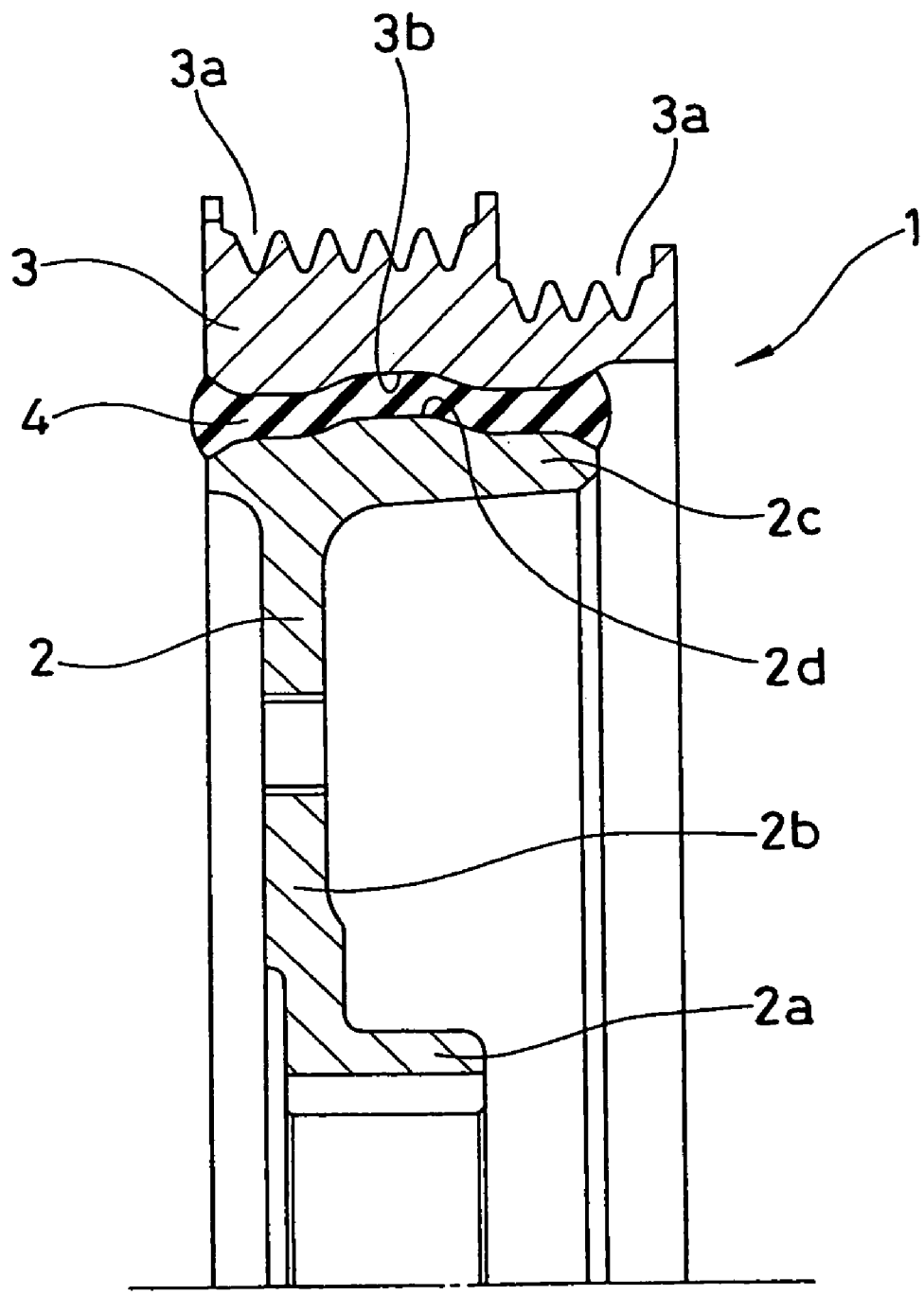
FIG. 1 is a half-cut face view of the torsional damper made by the production method according to the present invention.
Figure 2:
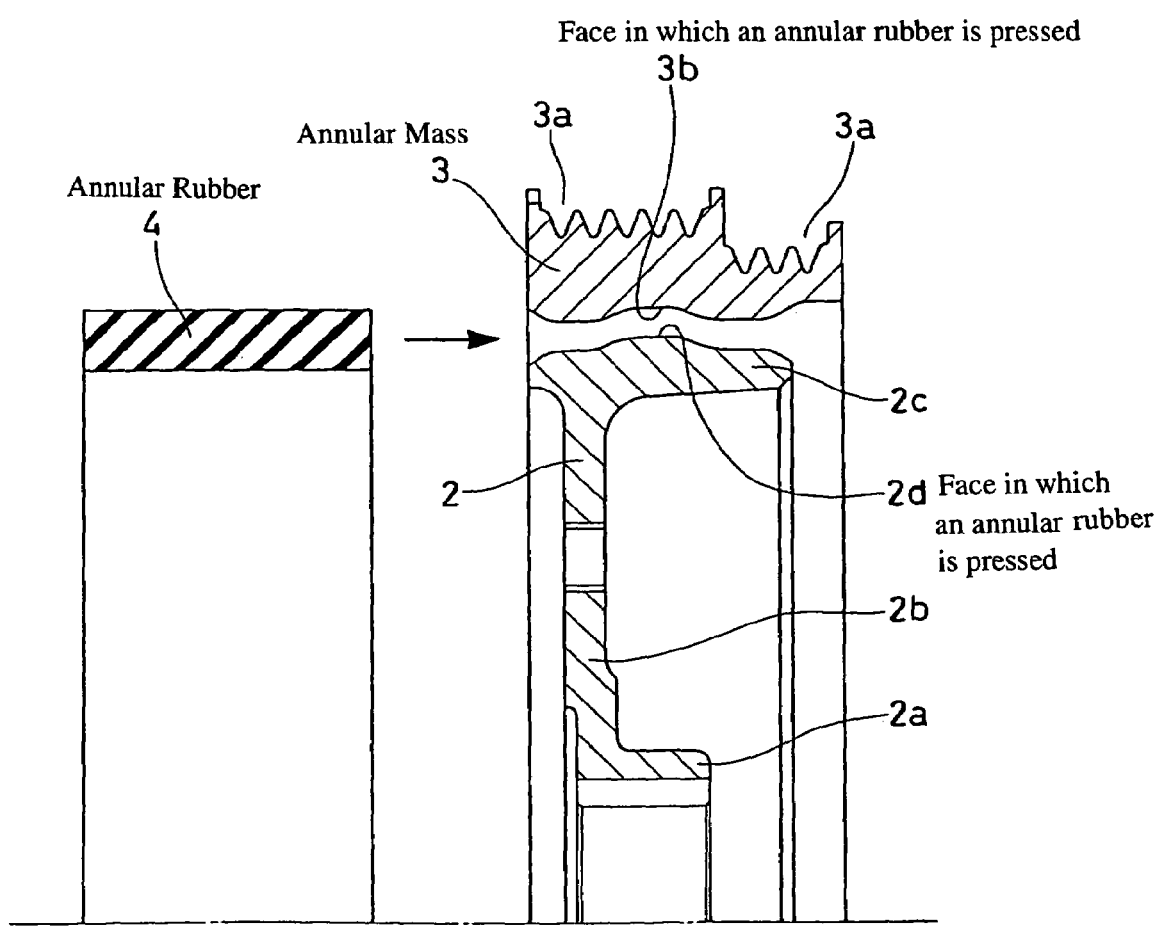
FIG. 2 is an explanatory view of the process of the production method of the torsional damper.

FIG. 1 shows the half-cut sectional view of a torsional damper 1 made by the production method according to the present invention. The torsional damper 1 comprises a hub 2 mounted on a crankshaft in an automobile engine or the like (not shown in the drawings), an annular mass 3 (also called a mass body) separately and concentrically disposed on the outer peripheral side of the hub 2, and an annular rubber 4 (also called an elastic body) pressed in an axial direction and fixed between the opposed faces of the hub 2 and the annular mass 3. Further, the torsional damper 1 has a constitution in which the hub 2 and the annular mass 3 are elastically connected each other through the annular rubber 4.

The hub 2 is annularly molded with a predetermined metallic material, and integrally comprises a boss part 2a mounted on a shaft end of the crankshaft, a disc-formed rising part 2b integrally molded from the boss part 2a in a radially outward direction, and a rim part 2c integrally molded with an outer peripheral end part of the rising part 2b.

The annular mass 3 is also annularly molded with a predetermined metallic material, and separately and concentrically disposed on the outer peripheral side of the rim part 2c, and a pulley groove 3a is formed at the outer peripheral face of the annular mass 3. The pulley groove 3a is prepared for transmitting a rotation torque of the crankshaft to various accessories via an endless belt.

The annular rubber 4 is annularly formed with a predetermined rubber material, and is pressed in for fitting between the outer peripheral face of the rim part 2c in the hub 2 and the inner peripheral face of the annular mass 3 opposed to the hub 2 with necessary compression allowance.

Moreover, the silane coupling agent (not shown) is applied between the rim part 2c in the hub 2 and the annular hub 4, and the annular rubber 4 and the annular mass 3 respectively. The silane coupling agent has the excellent effect for increasing sliding torque in pressure contacting surface of the rubber and the metal. Since the hub 2, the annular rubber 4 and the annular mass 3 are strongly kept each other, and the sliding torque is remarkably increased, and thus it is possible to effectively prevent the occurring of sliding in the rotating direction between the rim part 2c in the hub 2 and the annular rubber 4, and the annular hub 4 and the annular mass 3, at the time of inputting large torque by a dynamic damping operation or the like of the damper 1. In addition, the silane coupling agent is a water-soluble agent, so that the agent is used after diluting with an aqueous solution, for example, an ethanol aqueous solution or the other alcoholic aqueous solution, when this agent is applied to the predetermined part in the production process of the damper 1.

Next, the method of producing the torsional damper 1 is explained.

First, the hub 2, the annular mass 3 and the annular rubber 4 are formed to each shape of the part respectively, and a degreasing treatment is carried out to the hub 2 and the annular mass 3. Next, the annular mass 3 is set to the outer peripheral side of the hub 2 to press the annular rubber 4 in an axial direction in between the hub 2 and the annular mass 3. Before this press-in process, the silane coupling agent is applied to the faces 2d and 3b of the hub 2 and the annular mass 3 between which faces the annular rubber is pressed in, that is, the outer peripheral face of the rim part 2c of the hub 2 and the inner peripheral face of the annular mass 3 respectively. A spray method is suitably used for the application. The chemical surface treatment is not carried out to the faces 2d and 3b. After the application, the hub 2 and the annular mass 3 are left for more than 2 hours respectively to dry the silane coupling agent. An air dry method is suitably used for the drying. After the drying, the annular rubber 4 is pressed in an axial direction in between the faces 2d and 3b of the hub 2 and the annular mass 3 between which faces the annular rubber is pressed in.

As mentioned above, the silane coupling agent is dried fully by applying the silane coupling agent without carrying out the chemical surface treatment to the faces 2d and 3b of the hub 2 and the annular mass 3 between which faces the annular rubber is pressed in and leaving it for more than 2 hours. When the silane coupling agent is dried fully, the tackiness can be removed so that the annular rubber 4 can be smoothly pressed in. When the annular rubber 4 is smoothly pressed in, this annular rubber 4 is pressed in uniformly and the internal stress of the rubber becomes uniform, and thus it is possible to improve the strain durability of the torsional damper, as desired.

Furthermore, in the stage after drying the silane coupling agent during the above-mentioned process, the annular rubber 4 may be pressed in an axial direction in between the faces 2d and 3b after applying the lubrication oil to the faces 2d and 3b, that is, to the outer peripheral face of the rim portion 2c of the hub 2 and the inner peripheral face of the annular mass 3, or to the inner and outer peripheral faces of the annular rubber 4. If the annular rubber 4 is pressed-in in this way, the frictional resistance in the pressing can be significantly decreased, and thus the press-in load can be decreased, and the internal stress of the annular rubber 4 can become uniform. Therefore, it is possible to easily carry out the press-in work, improve the strain durability of the torsional damper 1 as the desired object, and enhance the axial and radial run-out accuracy of the annular mass 3 with respect to the bore portion of the hub 2 (Portion A in FIG. 3). As the applying method of the lubrication oil, an immersion method may also be used.

Figure 3:
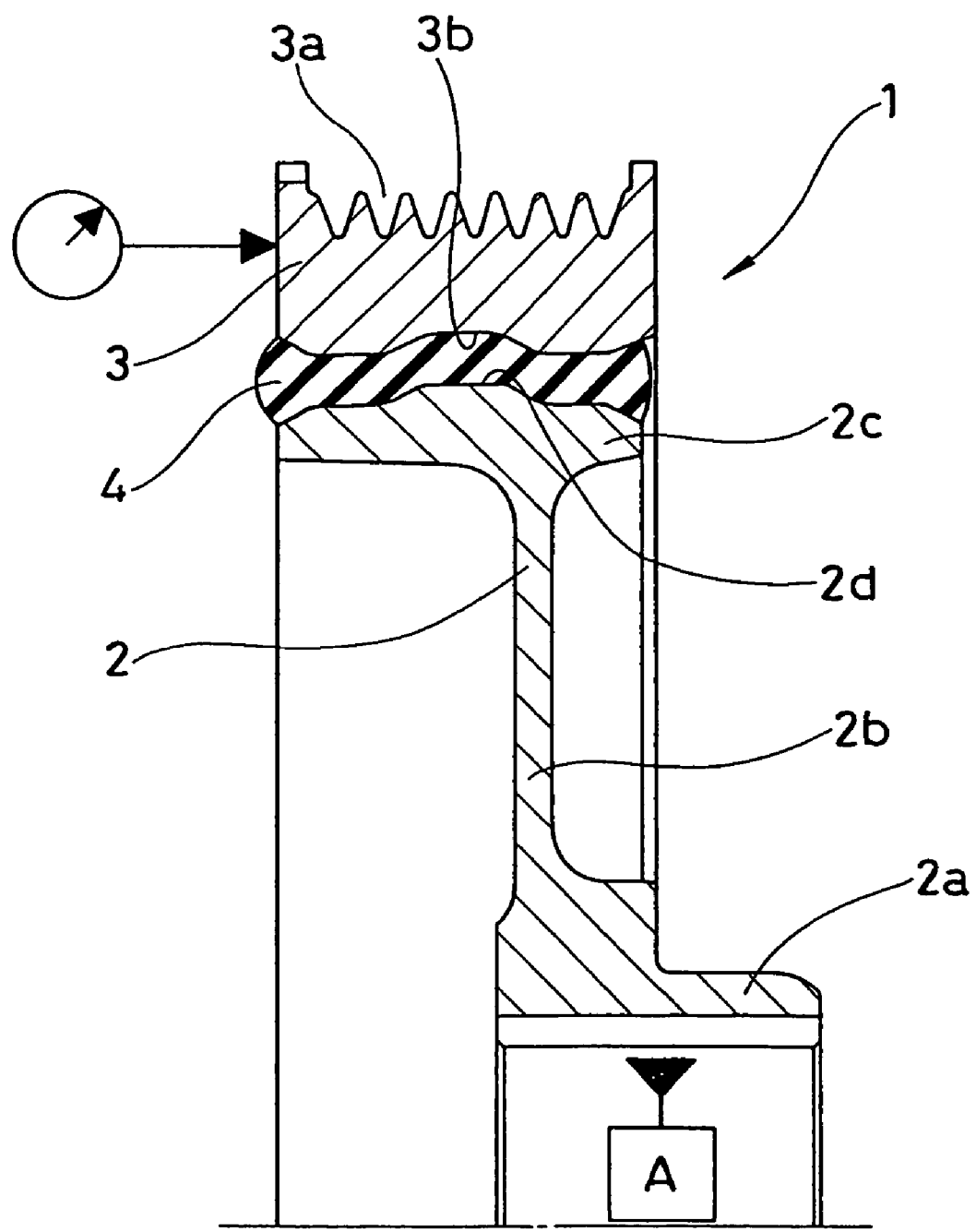
FIG. 3 is an explanatory view of a measuring position of the axial run-out accuracy.

In the comparison test carried out by the present inventors, the following results could be confirmed. As for an example where the three processes were carried out respectively, that is, the applying process of the silane coupling agent, the drying process and the applying process of the lubrication oil process, a necessary load in the press-in could be decreased from 23~28 kN to 18 kN, and the axial run-out accuracy could be improved from 0.22~0.33 mm to 0.15 mm, as compared with the comparison example 1 where the applying process of the silane coupling agent was not carried out, the comparison examples 2 and 3 where the drying process was not carried out, and the comparison examples 3 and 4 where the applying process of the lubrication oil was not carried out. The measuring position of the axial run-out accuracy was a position with respect to the bore portion A of the hub 2 (a bore face of a boss portion 2a) of the annular mass 3 (an end face portion of the annular mass 3), as shown in FIG. 3.

TABLE 1

| | Silane Coupling Agent | Drying | Lubrication Oil | Necessary Load in Press-in | Axial Run-out Accuracy |
| --- | --- | --- | --- | --- | --- |
| Comparison Example 1 | Not Carried Out | — | Carried Out | 25 kN | 0.25 mm |
| Comparison Example 2 | Carried Out | Not Carried Out | Carried Out | 23 kN | 0.22 mm |
| Comparison Example 3 | Carried Out | Not Carried Out | Not Carried Out | 27 kN | 0.32 mm |
| Comparison Example 4 | Carried Out | Carried Out | Not Carried Out | 28 kN | 0.33 mm |
| Example | Carried Out | Carried Out | Carried Out | 18 kN | 0.15 mm |

Run-out Accuracy: An average of N = 25 pieces

The present invention has the following effects.

That is, in the method of producing the torsional damper according to the present invention having the above-mentioned constitutions, the tackiness of the silane coupling agent can be removed by applying the silane coupling agent to the faces of the hub and the annular mass between which faces the annular rubber is pressed in, and leaving the agent for drying for the predetermined time period after the application, so that the undulation of the rubber can be prevented from occurring in the pressing of the annular rubber in between the hub and the annular mass. Therefore, the strain durability of the torsional damper can be improved as desired, and a damper product having excellent durability can be provided.

In addition to this, after the silane coupling agent is dried, since the annular rubber is pressed in after applying the lubrication oil to the hub and the annular mass or the annular rubber, the frictional resistance in the press-in can be decreased greatly, and thus the press-in load in the press-in can be decreased and the internal stress of the rubber can become uniform. Therefore, it is possible to easily carry out the press-in work, improve the strain durability of the torsional damper as desired, and enhance the axial and radial run-out accuracy of the annular mass with respect to the hub bore portion. As a result, the improvements of productivity and quality can be realized.

Furthermore, as mentioned, when the silane coupling agent is applied, it is not necessary to carry out the chemical surface treatment to the faces of the hub and the annular mass between which faces the annular rubber is pressed in.

What is claimed is:

1. A method of producing a torsional damper made by pressing an annular rubber in an axial direction in between a hub and an annular mass, the method comprising:

applying a silane coupling agent to faces of the hub and the annular mass between which faces an annular rubber is pressed in;

leaving said silane coupling agent for drying for a predetermined time period after applying the silane coupling agent;

applying fitting liquid to said hub and any one of said annular mass and said annular rubber after the drying; and pressing said annular rubber in between said hub and said annular mass after applying the fitting liquid.

2. The method of producing the torsional damper according to claim 1, the method comprising:

applying the silane coupling agent without carrying out a chemical surface treatment to the faces of the hub and the annular mass between which faces the annular rubber is pressed in.

3. The method of producing the torsional damper according to claim 2, wherein the fitting liquid is a lubrication oil.

4. The method of producing the torsional damper according to claim 1, wherein the fitting liquid is a lubrication oil.

* * * * *